(12) United States Patent
Tanaka

(10) Patent No.: US 6,847,595 B2
(45) Date of Patent: Jan. 25, 2005

(54) LENS ACTUATOR

(75) Inventor: Akihiro Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/665,153

(22) Filed: Sep. 22, 2003

(65) Prior Publication Data

US 2004/0052169 A1 Mar. 18, 2004

Related U.S. Application Data

(63) Continuation of application No. 09/930,128, filed on Aug. 16, 2001, now Pat. No. 6,704,255.

(30) Foreign Application Priority Data

| Aug. 22, 2000 | (JP) | 2000-251171 |
| Oct. 12, 2000 | (JP) | 2000-312225 |

(51) Int. Cl.⁷ .................................................. G11B 7/00
(52) U.S. Cl. ................... 369/44.14; 369/44.23; 359/813; 359/823
(58) Field of Search .................. 369/44.14, 44.15, 369/44.22, 44.23, 44.11, 47.1; 359/813, 814, 823, 824

(56) References Cited

U.S. PATENT DOCUMENTS 6,339,511 B1   1/2002   Tanaka

FOREIGN PATENT DOCUMENTS

JP   09-190636   7/1997

*Primary Examiner*—Muhammad Edun
(74) *Attorney, Agent, or Firm*—Dickstein Shapiro Morin & Oshinsky LLP

(57) ABSTRACT

In a lens actuator for use with an optical recording and reproducing apparatus in accordance with a plurality of different multiplied response numeric values to record or reproduce to or from an optical recording medium, the lens actuator actuates an objective lens to control focusing and tracking and includes a fixed magnetic circuit including a magnet as a magnetic flux generating source and a back yoke, a support structure that is elastically displaceable depending on a thrust generated amount; and a movable part including a holder fixing the objective lens and a solenoid coil capable of generating a focusing thrust and a tracking thrust in accordance with current values, respectively. And in the lens actuator, a resonance frequency around a tangential axis is set to be different from spindle rotation frequencies corresponding to the plurality of multiplied response numeric values.

7 Claims, 14 Drawing Sheets

FIG.1
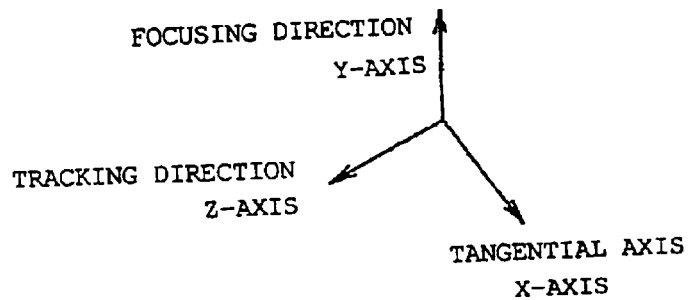
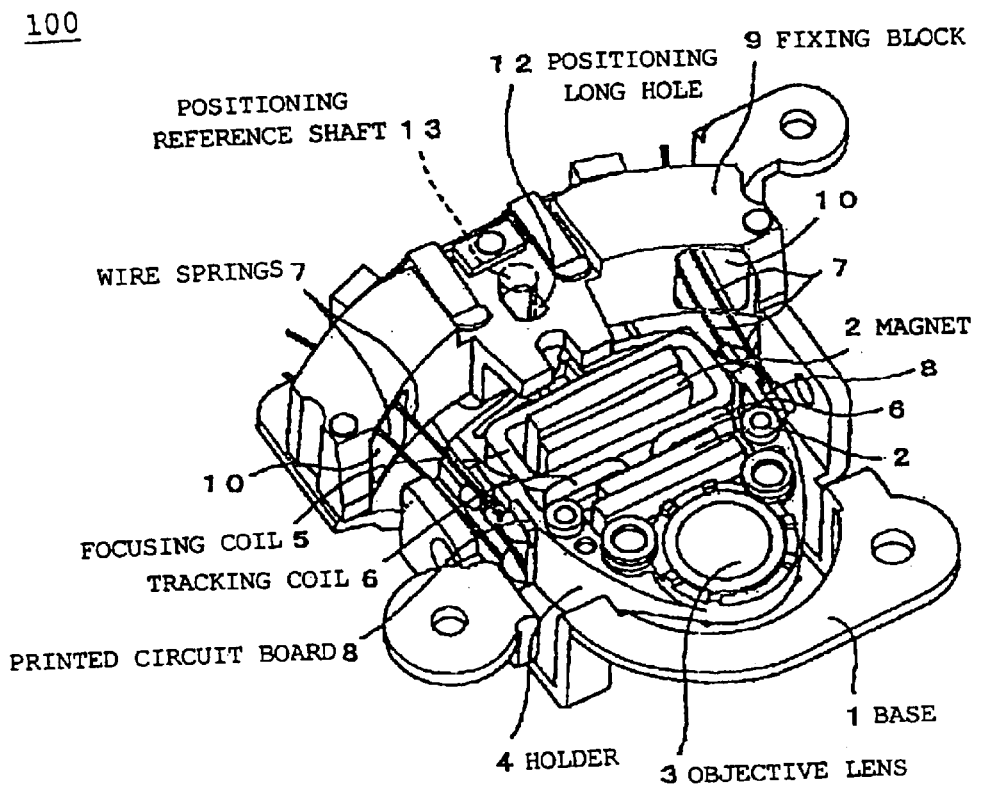

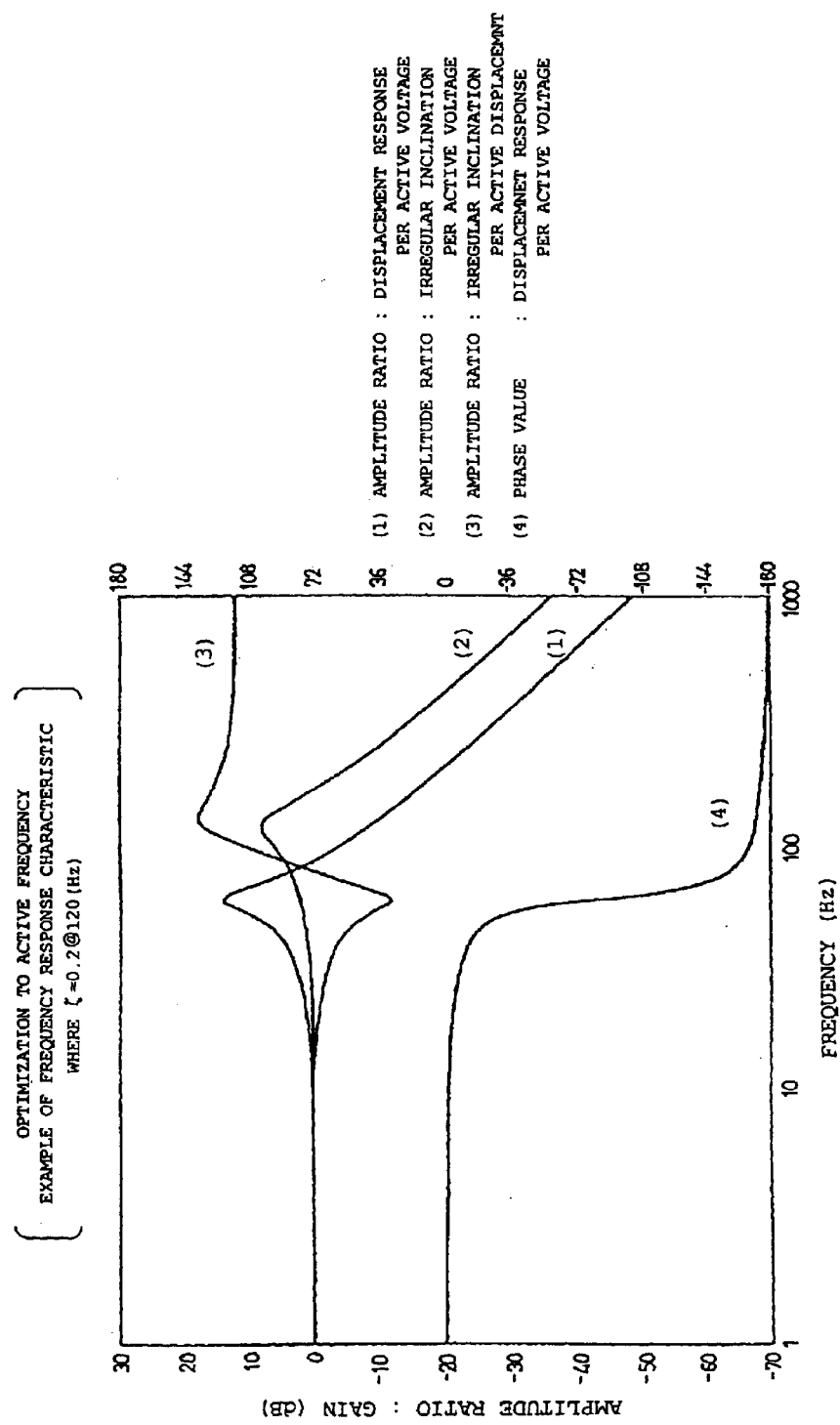

LENS ACTUATOR

This application is a continuation of U.S. patent application Ser. No. 09/930,128 filed Aug. 16, 2001, now U.S. Pat. No. 6,704,255 which is hereby incorporated by reference.

BACKGROUND OF THE INVENTION

1. Field of the Invention

The present invention generally relates to a lens actuator used for a device (hereinafter called an optical disk drive device) including a plurality of values for different multiplied speeds for optically recording and reading information to a recording medium.

2. Description of the Related Art

In a lens actuator used for an active control, it is required to employ a movement mechanism for maximally reducing a loss operation caused by a non-linear characteristic. Thus, a spring support mechanism has been widely applied as a support mechanism of the lens actuator used in the optical disk drive device that requires a high accurate control. A detailed description of a mechanism supporting a light pickup by four support springs (linier elastic member) is found in Japanese Laid-Open Patent Application No.9-190636 (Japanese Patent No.2856176), for example.

On the other hand, since it is required to mount a high NA objective lens due to an increase of a record density, a tilt of an optical axis caused by an irregular rotation in a translational motion of focusing and tracking needs to be suppressed. However, according to the mechanism described in Japanese Laid-Open Patent Application No.9-190636 (Japanese Patent No.2856176), a compliance (elastic coefficient) in both directions of the support spring needs to be lower in order to improve displacement sensibilities of a focusing direction and a tracking direction. In addition, since an outside dimension is limited by minimization and be lightweight and an arrangement and a size of the support spring are limited, there is a problem such that a torsional rigidity in a radial direction is inevitably degraded due to a principal of this mechanism.

The irregular rotational motion in the radial direction is caused during the translational motion, by an assembly error, by an irregular moment of a driving thrust when a focusing operation and a tracking operation are translationally shifted, or by a slight asymmetry caused by an assembly error of a support spring. The occurrence of the irregular rotational motion causes characteristic problems and also decreases a yield and increases costs of production.

The tilt of the optical axis caused by the irregular rotational motion has been discussed and recognized mainly as a problem for a DC (Direct Current) shift of the lens actuator along with tilts of a radial axis and a tangential axis. First, as described above, the irregular moment is caused on an active radius of a thrust in a direction where a DC shift amount perpendicularly crosses. Second, a frequency of a resonance (hereinafter called a roll resonance) could be set higher than that of a maximum spindle rotation in a specification of a conventional optical disk drive device.

However, since a higher speed has been required recently for the optical disk drive device, the frequency of the spindle rotation tends to be higher than that of the roll resonance of the conventional lens actuator in a reproducing operation and a recording operation. When both frequencies correspond to each other, such as a phenomenon described later can be caused.

A surface vibration of the optical disk and an eccentric factor of a spectrum tend to intensively show low frequency factors in accordance with a natural principal and a primary factor, that is, a larger spindle rotation frequency factor exists in a disk standard. In detail, the surface vibration and the eccentric factor, which include the spindle rotation frequency factor of the disk, become a compulsory feedback to the lens actuator focusing and tracking and then becomes active as exciting forces.

There is no problem only when these exciting forces are active as a logically pure translational thrust. However, when the translational thrust is occurred to each of the focusing operation and the tracking operation, it is not possible to prevent a state in which the DC shift occurs in the tracking direction and the focusing direction that are perpendicular each other. As a result, this DC shift amount functions as the active radius and the translational thrust causes an irregular thrust moment. Also, since the irregular thrust moment has the same frequency factor as the roll resonance frequency due to the above-described frequency correspondence, a rotation resonance is caused by the exciting force of a synchronized signal.

A tilt amount in the radial direction by AC (Alternating Current) caused by the rotation resonance exceeds far above a peak value of a tilt amount in the radial direction conventionally caused by the DC shift, and modulates an amplitude of a tracking error signal or a RF (Radio Frequency) signal and then prevents a stable performance of recording or reading. Thus, a servo error can occur.

Since these above problems are related to the resonance, it is not effective to use a means of offsetting irregular moments of the focusing operation and the tracking operation, which are used for an irregular inclination in a consideration of the DC shift only.

Consequently, a synchronous signal vibration in the roll resonance frequency is a vibration condition to maximize the sensitivity of tilting in the radial direction. When the surface vibration of the optical disk or the AC exciting force for an eccentric follow-up additionally occurs in an inevitable cumulative deviation in the focusing direction or the DC shift such as a carriage follow-up error or a like, the tilt amount in the radial direction is rapidly increased. As a result, the amplitude of the RF signal is modulated and then an error rate is increased or an occurrence possibility of the servo error is increased. Accordingly, it is greatly prevented to improve a speed. It is difficult to realize the requirement of the higher speed in the lens actuator.

However, the roll resonance frequency always exists somewhere when the lens actuator is used. Thus, it is not possible to avoid the above disadvantageous features caused by the roll resonance frequency. For the sake of convenience, the above description is predicated on the spring support structure, but the same disadvantageous features occur on other structures such an elastic hinge or bearing. Accordingly, it is desired to avoid the spindle rotation frequency and also set the roll resonance frequency. It is the most desirable to set the roll resonance frequency higher than the spindle rotation frequency for a maximum number of activated rotations.

However, in response to a requirement of the high speed operation above-described, a rotation speed, which is required to the optical disk drive within the operation time of the lens actuator used for the optical pickup, is not always conducted in an identical condition. In addition, since the different spindle rotation number is controlled based on each of the reading operation and the recording operation for a CD (Compact Disc) or a DVD (Digital Versatile Disk).

Moreover, according to a principal of a natural vibration, the roll resonance frequency is proportional to a square root of a torsional spring constant in the spring support structure and also is inversely proportional to a square root of a moment of intertia in a movable structure. According to this principal, for the roll resonance frequency to be sufficiently high, it is required to set the torsional spring constant to be greatly higher than the conventional torsional spring constant, it is required to set the moment of intertia to be extremely smaller than the conventional moment of intertia, or both determinations are required. Generally in the spring support structure, when the support spring is set so as to be a lower compliance in order to make the DC sensitivity higher, the torsional spring constant can not be avoided to be lower because the torsional spring constant is dependent on a state of the compliance. On the other hand, in another support structure that is not likely to be influenced by such the state of the compliance, it is required to provide a pair of thrust generating sources at each of both sides for symmetry thereof since the support structure occupies a center area of the movable configuration. Consequently, each configuration must be large enough to support an increase in the moment of inertia.

As describe above, it is difficult to realize a desired roll resonance frequency alone that is sufficiently higher while satisfying other advantageous features in any one of the above configurations.

Furthermore, when it is impossible for a certain reason to set so as to fully avoid the roll resonance frequency in the actuator used for the driver using a plurality of different frequencies, it is required to fully reduce the AC tilt sensitivity itself. Since the AC tilt described here is the radial tilt sensitivity in a roll resonance region, that is, the AC tilt is a sum with a radial DC tilt factor, and a roll resonance magnification factor, in order to reduce the AC tilt, it is necessary to reduce a radial DC tilt factor, it is necessary to reduce the factor other than the radial DC tilt factor, that is, the resonance magnification in roll resonance, or it is needed to reduce the both.

However, even if a tilt sensitivity in a low cycle can be lower, in the conventional actuator, as for this, the resonance magnification in active natural oscillating frequency is 10 (dB) or more than that, that is, an amplitude is about 3 or more times of a low cycle factor. Since a damper material temporarily optimized for the natural-oscillating frequency and used for the actuator degrades an attenuation ability in a higher frequency than the natural-oscillating frequency, that is, the roll frequency, it cannot be avoided that the AC tilt sensitivity in the low frequency becomes greater than 3 or more times.

With the conventional technology, in order to reduce the resonance magnification, the damper material and its form are selected and used. In the actual condition that the irregular resonance exists in frequency higher than active resonance, in order to suppress the irregular resonance magnification to be lower than a fixed level, it is necessary to suppress the active resonance magnification to be considerably lower.

Recently, since the irregular resonance approaches to disk rotation frequency and an inclination amount of the irregular resonance becomes greater, it is more important to suppress the roll resonance. In order to suppress the roll resonance, the damper material is filled so that the resonance magnification in the active natural oscillating frequency can be suppressed less than 6 (dB).

Generally, a high viscous damper material may be used, an area of the filling part of the damper material may be increased, or the both may be employed. However, in this case, the equivalent spring constant factor, which the damper material has, increases rapidly and then the active DC sensitivity is reduced. Or, since the phase is delayed in the low frequency region by over attenuation in an active mode, even in a case of spring support structure, an unfavorable hysteresis characteristic is generated.

SUMMARY OF THE INVENTION

It is a general object of the present invention to provide lens actuators in which the above-mentioned problems are eliminated.

A more specific object of the present invention is to provide a lens actuator that can lessen influence of the roll resonance factor preventing an improvement in speed.

Another object of the present invention is to provide a lens actuator in that damper material is used, an occurrence of the over attenuation can be prevented in active resonance frequency, the influence of a roll resonance factor can be controlled, and a higher speed can be realized.

The above objects of the present invention are achieved by a lens actuator for use with an optical recording and reproducing apparatus in accordance with a plurality of different multiplied response numeric values to recording or reproducing to or from an optical recording medium, the lens actuator for actuating an objective lens to control focusing and tracking, the lens actuator including: a fixed magnetic circuit including a magnet as a magnetic flux generating source and a back yoke; a support structure that is elastically displaceable depending on a thrust generated amount; and a movable part including a holder fixing the object lens and a solenoid coil capable of generating a focusing thrust and a tracking thrust in accordance with current values, respectively, whereby a resonance frequency around a tangential axis is set to be different from spindle rotational frequencies corresponding to the plurality of multiplied response numeric values.

According to the present invention, the resonance frequency around the tangential axis can be set to be a frequency other than the spindle rotation frequency according to a specification of a device corresponding to a plurality of different multiplied response values. Therefore, it is possible to reduce influence of the roll resonance factor detrimental to improvement in the speed.

Alternatively, the resonance frequency around the tangential axis can be set to be the spindle frequencies that are to be a reproducing maximum speed and a recoding maximum speed corresponding to the plurality of different multiplied response numeric values, respectively, or lower than the spindle rotational frequencies at a reproducing maximum speed and a recording maximum speed and is set to be higher than the spindle rotation frequency at a standard speed, or a frequency in a not-used rotation frequency band between the spindle rotational frequencies at a reproducing maximum speed and a reading maximum speed.

Therefore, it is possible to reduce influence of the roll resonance factor detrimental to improvement in the speed.

The above objects of the present invention are achieved by an objective lens actuator for use with an optical recording and reproducing apparatus, said lens actuator including: a holder holding an objective lens; a fixed magnetic circuit provided on a base member; a movable part including said holder and a solenoid coil capable of generating a focusing thrust and a tracking thrust in accordance with current values, respectively, with the fixed magnetic circuit; and an elastic support member coupling said movable part to a fixing block member while displacing depending on a thrust generation amount; wherein a damper for resonance attenuation is provided to said the elastic support member and the damper, which has characteristics of obtaining a maximum attenuation or a maximum loss in a vicinity of the resonance frequency around a tangential axis, is used.

According to the present invention, by using the damper having characteristics of obtaining the maximum attenuation or the maximum loss in a vicinity of the resonance frequency around the tangential axis in the objective lens actuator, it is possible to prevent over attenuation in an active resonance frequency and alto it is possible to reduce influence of the roll resonance factor detrimental to improvement in the speed.

Alternatively, by using a damper having characteristics of obtaining a maximum attenuation or a maximum loss in a vicinity of an usable maximum rotation frequency of the optical recording and reproducing apparatus, it is possible to prevent the over attenuation in the active resonance frequency and it is possible to suppress the influence of the roll resonance factor detrimental to improvement in the speed.

Moreover, alternatively, by using a damper having characteristics of obtaining a maximum attenuation or a maximum loss from a vicinity of an usable maximum rotation frequency of the optical recording and reproducing apparatus to a vicinity of a resonance frequency of around a tangential axis, it is possible to prevent the over attenuation in the active resonance frequency and it is possible to further effectively suppress the influence of the roll resonance factor detrimental to improvement in the speed.

Furthermore, alternatively, by using a damper having characteristics of obtaining the maximum attenuation or the maximum loss in 100 through 200 Hz band, it is possible to prevent the over attenuation in the active resonance frequency and it is possible to concretely and effectively suppress the influence of the roll resonance factor detrimental to improvement in the speed.

In details, the damper is made form materials including a polymeric composite or a polymeric material as a main material. Or the damper is made from a rubber composite or a rubber material as a main material. Or damper is made from a silicone composite or a silicone material as a main material. Therefore, the optimal damper is used in accordance with a specification and characteristics of the objective lens actuator or the optical disk recording and reproducing apparatus.

BRIEF DESCRIPTION OF THE DRAWINGS

In the following, embodiments of the present invention will be described with reference to the accompanying drawings.

FIG. 1 is a perspective diagram showing a front side of a lens actuator according to a first embodiment of the present invention;

FIG. 14 is a diagram illustrating the frequency response characteristic of the objective lens actuator according to the second embodiment of the present invention.

DESCRIPTION OF THE PREFERRED EMBODIMENTS

[First Embodiment]

Figure 2:
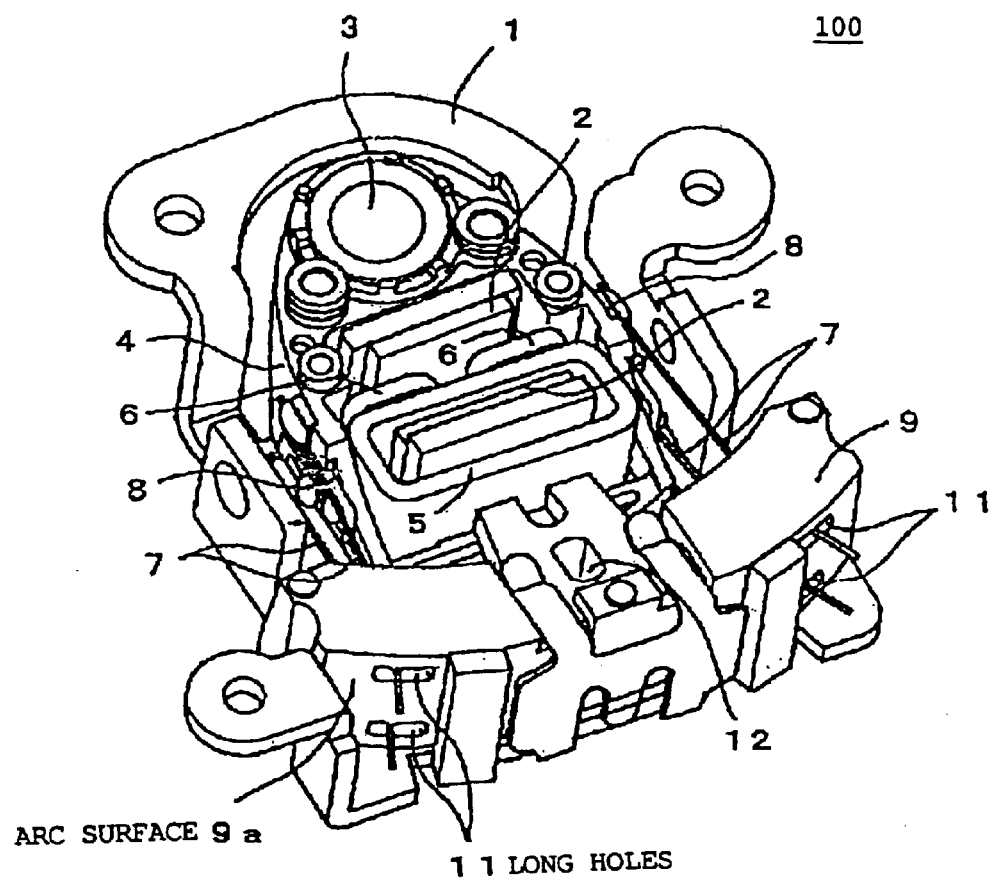
FIG. 2 is a perspective diagram showing a backside of the lens actuator in FIG. 1.

FIG. 1 is a perspective diagram showing a front side of a lens actuator according to an first embodiment of the present invention. FIG. 2 is a perspective diagram showing a back side of the lens actuator in FIG. 1. The lens actuator 100 includes a base 1, a magnet 2 provided so as to face to the base 1, an objective lens 3, a holder 4 holding the objective lens 3, a focusing coil 5, a tracking coil 6, at least four wire springs 7 that are holder support springs, a printed circuit board 8 for fixing the wire springs 7 fixed at both sides of the holder 4 and for a coil electric supply, and a fixing block 9 for fixing ends of the wire springs 7.

A movable part includes the objective lens 3 fixed to and held by the holder 4, the focusing coil 5, the tracking coil 6, and the printed circuit board 8. A fixing part includes the base 1 serving as a back yoke of a magnetic circuit, the magnet 2, the fixing block 9 fixed on the base 1.

A fixed magnetic circuit is formed by the magnet 2 as a magnetic flux generating source and the base 1 as the back yoke. The holder 4 is supported against the fixing block 9 by the four wire springs 7, which are provided so as to be symmetrically related each other, so that an elastic deformation can be realized by corresponding to an amount of generated thrust. A focusing and a tracking thrust can be occurred to the objective lens 3 supported and fixed by the holder 4 in accordance with a current value flowing through the focusing coil 5 and the tracking coil 6.

One end of each wire spring 7, which another end is fixed on the printed circuit board 8 of the holder 4, passes along a hollow 10 for filling damper material that takes distance in the inside wall of the fixing block 9 and is formed as one pair. And, as shown in FIG. 2, the end of each wire spring 7 penetrates a long hole 11 that is formed so as to pass through the hollow of the fixing block 9, and then the end of each wire spring 7 is fixed by soldering on a pattern of a flexible printed circuit board (not shown) that is provided in arc surface 9a formed in the back wall of the fixed block 9.

In this case, a fixed pattern for the wire springs 7 can be a pattern formed on the printed circuit board. In another case, the fixed pattern for the wire springs 7 can be a metal pattern directly formed on the fixing block 9 that is a molding resin product. In addition, for example, a gel material of a silicone type can be used as the damper material for filling the hollow 10.

Moreover, a positioning long hole 12 is formed on the fixing block 9. A positioning reference shaft 13 is inserted into the positioning long hole 12 in FIG. 1 and positioning in a rotation direction of the fixed block 9 around a focusing direction (Y-axis) shown in FIG. 1 is performed. The positioning reference shaft 13 may be provided on the base 1 or on an assembly work stand fixed to the base 1 as a reference. Fixing is performed after positioning and then a method for adhering or attaching screws between the base 1 and the fixing block 9 can be applied.

In this embodiment, metal wire springs are used as the wire springs 7 and soldering as a fixing method is used to serve also as electric supply connection. Alternatively, a suitable material can be selectively used as a material of wire springs 7 in accordance to specification, design conditions, or the like. For example, a support spring having the elasticity of a board spring or the like may be used. An adhesion or insertion molding method can be suitably chosen and adapted as the fixing method in accordance to a quality of the material and a structure of the support spring.

Figure 3:
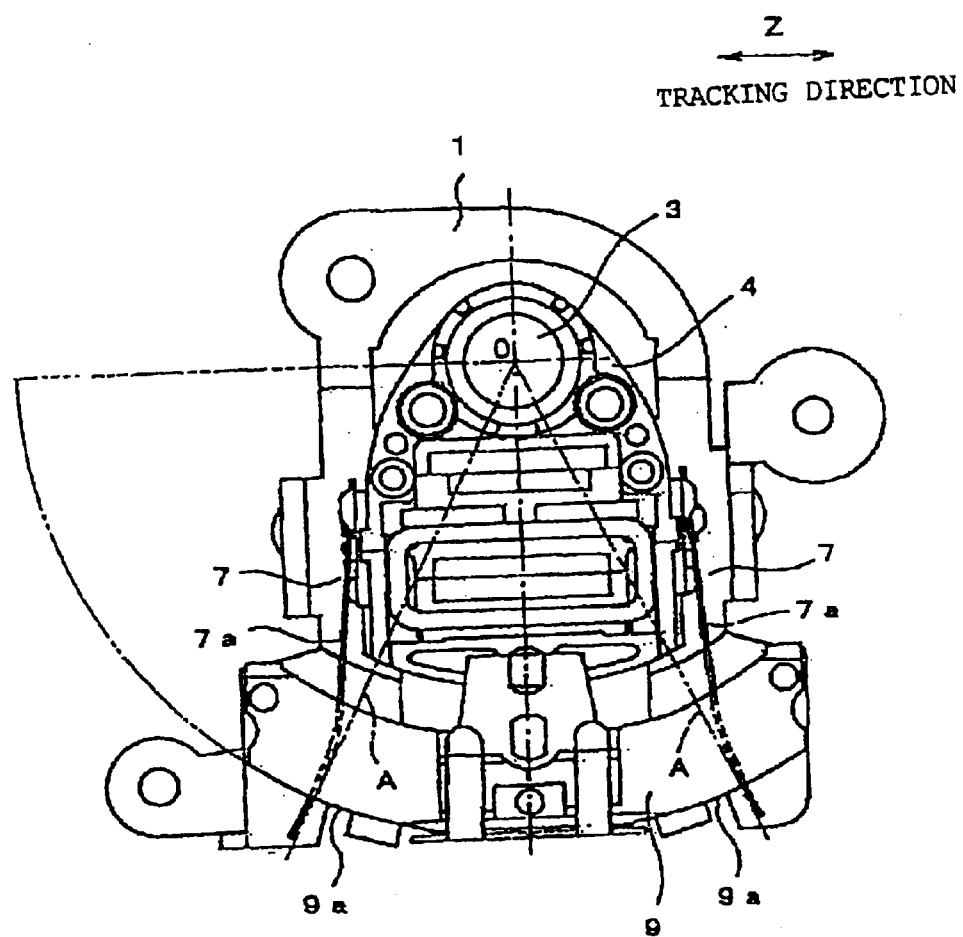
FIG. 3 is a plan view of a first configuration example of the lens actuator according to the first embodiment.

FIG. 3 is a plan view of a first configuration example of the lens actuator according to the first embodiment. In FIG. 3, the holder 4 is supported by the four wire springs 7 to the fixed block 9, and a fixed position side of the fixed block 9 is extended for an interval in tracking direction in a free straight line portion 7a between the holder 4 and the fixing block 9 in each wire spring 7 toward the fixed position side of a holder 4. And also each wire spring 7 is curved toward outside near a fixed portion of the fixing block 9.

Figure 4:
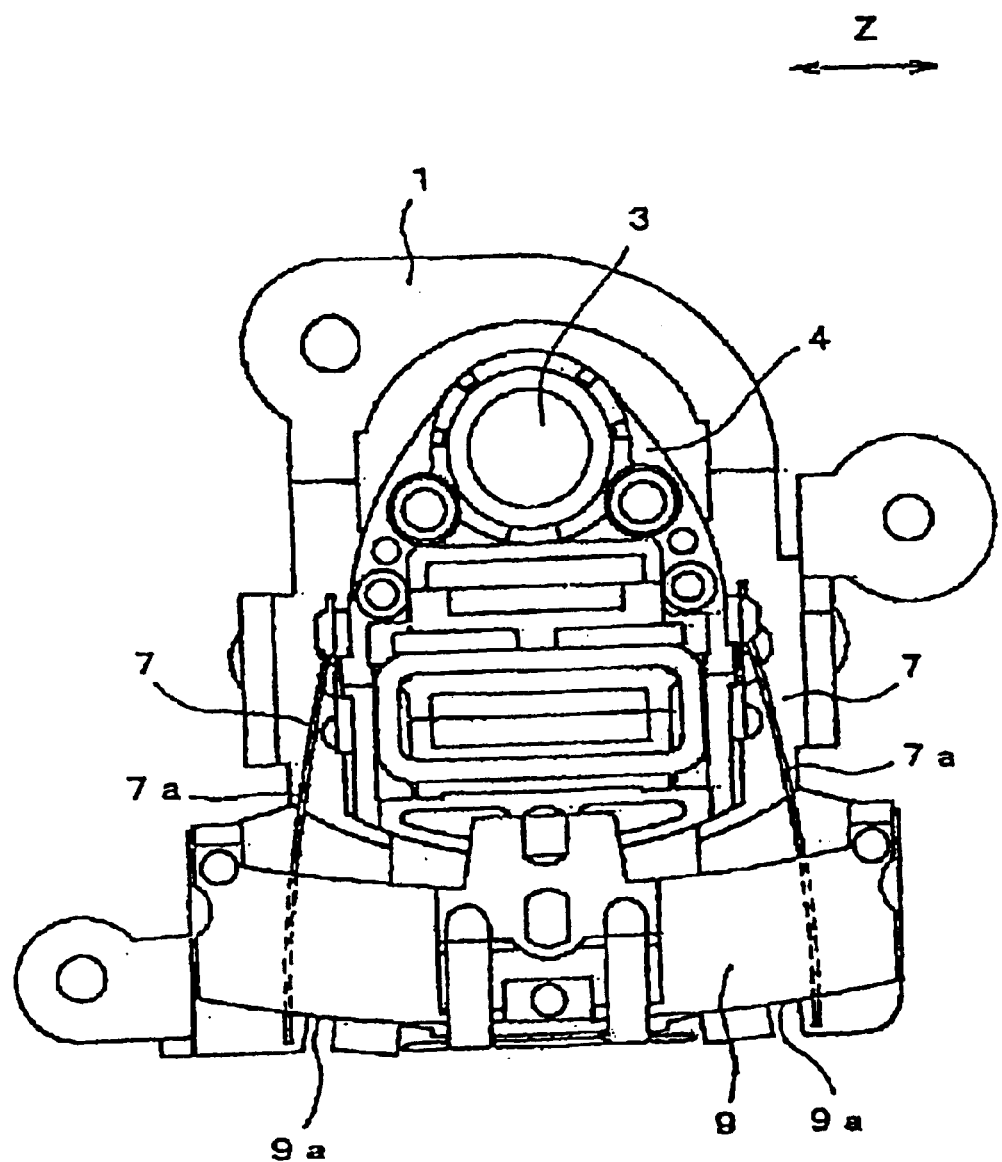
FIG. 4 is a plan view of a second configuration example of the lens actuator according to the first embodiment.

FIG. 4 is a plan view of a second configuration example of the lens actuator according to the first embodiment. In FIG. 4, differently from the first configuration example in FIG. 3, the wire springs 7 are formed so as to curve. Basically other than this different point, the second configuration example in FIG. 4 is similar to the first configuration example in FIG. 3, and elements that are the same as the ones in FIG. 3 are indicated by the same reference numerals and the explanation thereof will be omitted. That is, in the second configuration example, a point in which the fixed position side of a fixing block 9 is extended for the interval in the tracking direction of free straight line portion 7a between the holder 4 and the fixing block 9 in each wire spring 7 toward the fixed position side of the holder 4, is the same as that of the first configuration example. However, another point in which each wire spring 7 is curved toward inside near the fixed portion of the fixing block 9, is different from that of the first configuration example.

That is, in the second embodiment, the wire springs 7 are curved toward inside while the wire springs 7 take a large angle in the free straight line of the wire springs 7 and an increase in the compliance of the tracking direction is reduced. And also, the compliance of the radial rotation direction (the roll rotation direction) is reinforced.

The angle of the free straight line of each wire spring 7 in the first configuration example is smaller than that in the second configuration example and the straight line of each wire spring 7 is curved toward outside. In the first configuration example, an effect by compliance reinforcement in the roll rotation direction is lower than that in the second configuration example. However, the same effect can be acquired by lengthening the interval in a tracking direction (Z-axis) shown in FIG. 1 at the fixed position of the fixing block 9 for each wire spring 7.

When the lens actuator 100, which is entirely shown in FIG. 1, is assembled and combined, a rotation adjustment around the focusing direction (Y-axis) is performed in order to minimize the irregular rotation around the focusing direction (Y-axis) and the tangential axis (X-axis) in the translational motion.

In a conventional rotation adjustment, an irregular radial tilt amount, which was generated when the DC shift was given in the focusing direction, was adjusted. However, in this embodiment, the irregular radial tilt amount, which is generated when the AC shift is given in the focusing direction is minimized.

By such a movable part configuration, after reducing the inertia moment by reducing weight, a torsion spring constant can be raised while a wire spring stabilizes at a low compliance, and roll resonance frequency can be dramatically raised.

When the movable part of the lens actuator 100 and a support structure are attached, a part positioning is performed for the movable part and the fixing block 9 on an optical axis of the object lens 3 and a coax. The wire spring adherence part surface is also a coaxial cylinder surface, which restrains the support spring (a wire spring or board spring) at a side of the fixing block 9 in that an action radius is enlarged from a coaxial line. Accordingly, when the lens actuator 100 is assembled, even if a relative rotation displacement occurs on the parts around the focusing direction (Y-axis), an effective length of the support spring cannot be changed easily. Thus, an asymmetry of the compliance, which is caused by different lengths of the wire springs 7 provided at the both wings of the movable part, can be prevented. Also, it is possible to reduce occurrences of the irregular rotational movement around the tangential axis (X-axis).

From a viewpoint of improvement in workability, the stability of characteristics, and lens optical-axis displacement prevention, a relative-position adjustment of the tracking-direction factor of the fixing block 9 of the support structure and a fixed magnetic circuit is conducted by a rotation adjustment around a shaft forming the optical axis, a coax, or a coax like of the objective lens 100 of the movable part.

The roll resonance frequency is set and adjusted so as to be sufficiently higher than or a different frequency from any of the spindle rotation frequency used as the maximum speed of the record or reproduction in an optical disk drive device specification. Therefore, it is possible to prevent the irregular moment from causing the rotational resonance.

Figure 5A:
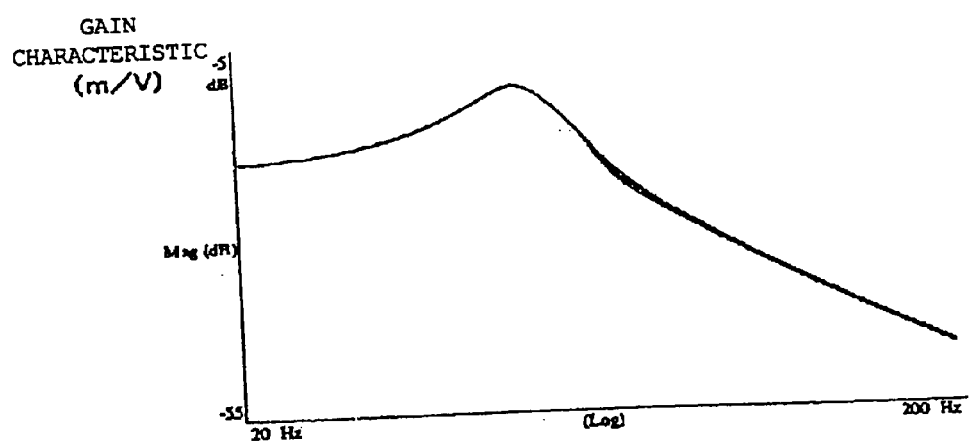
FIG. 5A is a graph showing a gain characteristic in the tracking direction in focus neutral position and ±0.3 mm (DC shift)
Figure 5B:
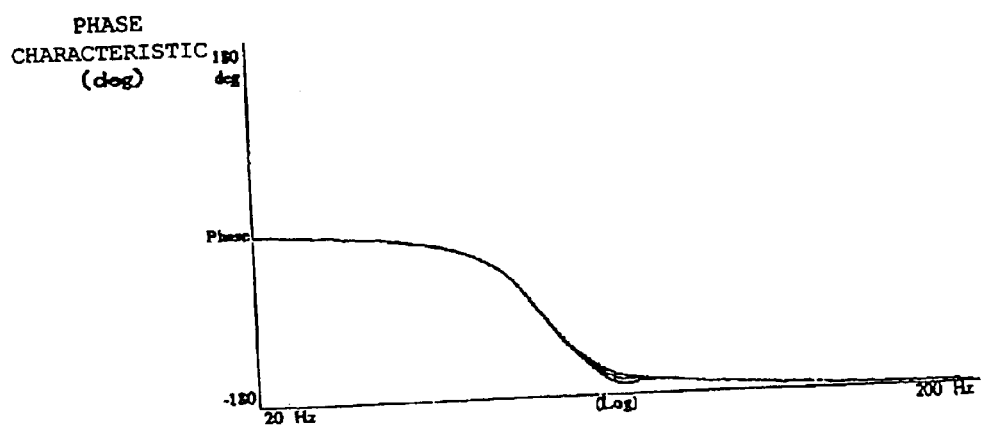
FIG. 5B is a graph showing a phase characteristic in the tracking direction in focus neutral position and ±0.3 mm (DC shift)

In FIG. 5A and FIG. 5B, examples of the frequency response characteristic of the lens actuator 100 in a case in which roll resonance frequency is not considered with the spindle rotation frequency, are shown. In the example, the lens actuator 100 is shown, in which a 32-times speed reproduction CAV (Constant Angular Velocity) and a 8-times speed record CLV (Constant Linear Velocity) is employed as a multiplied speed correspondence numeric value expressed as a 2 or 4 times speed of a standard data transfer speed.

In FIG. 5A and FIG. 5B, the frequency response characteristic in the tracking direction in focus neutral position and ±0.3 mm (DC shift) are shown among the characteristics of the lens actuator 100. A gain characteristic is shown in FIG. 5A and a phase characteristic is shown in FIG. 5B. Referring to FIG. 5A and FIG. 5B, a tracking natural value exists around 50 Hz and a roll resonance influenced by the tracking natural value exists around 60 Hz. It cannot be seen that these characteristics cause problems.

However, in the 8-times record CLV, the spindle rotation frequency is about 60 Hz through 70 Hz in an OPC (Optimum Power Control) region. Then, a phenomenon of synchronizing signal excitation occurs on the roll resonance frequency in this OPC region.

Figure 6:
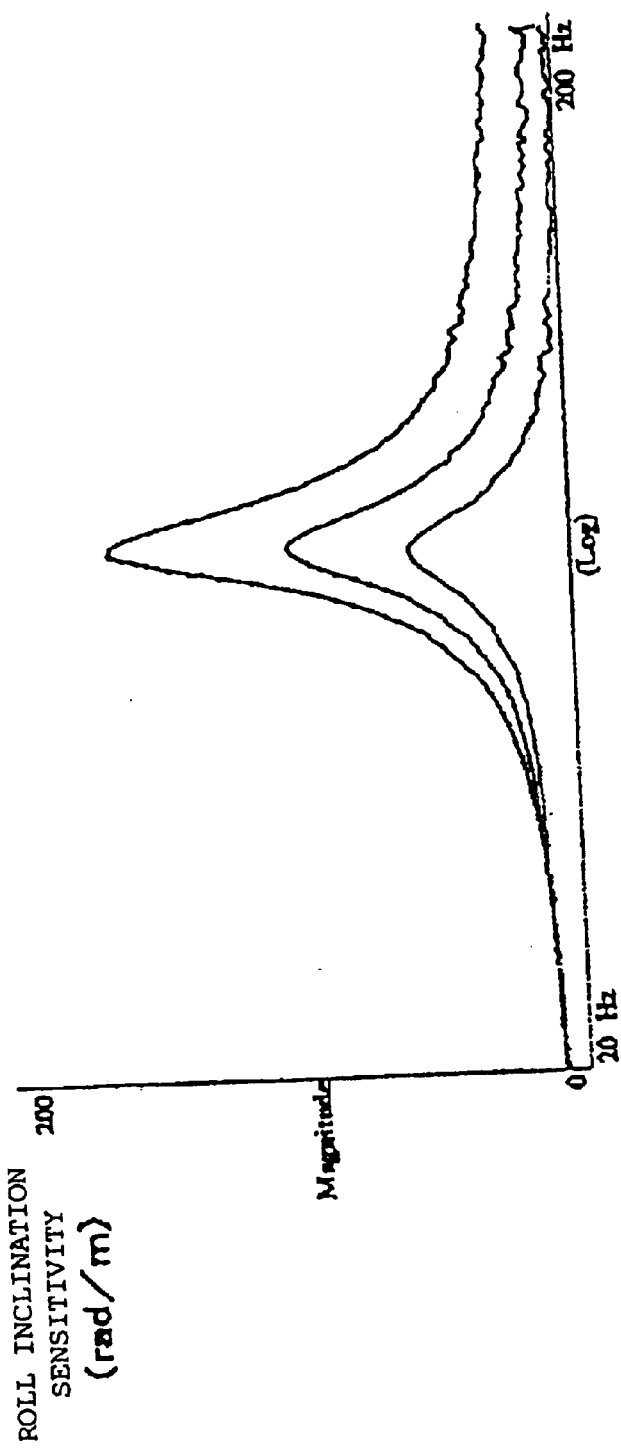
FIG. 6 is a graph showing roll inclination sensitivity in the focus neutral position and ±0.3 mm.

In FIG. 6, the roll resonance characteristic in the focus neutral position and ±0.3 mm is expressed with roll inclination sensitivity (rad/m) for displacement amplitude of tracking. A 0.3 mm shift of a focus is illustrated as the numeric value that is possible as accumulation initial deviation from a disk surface to the objective lens 3. One (rad/m) is equivalent to about 0.6 (degree/mm). According to this, the roll inclination sensitivity in 60–70 Hz is more than about 5 (degree/mm). When a deflection primary component including a medium, a chuck, or a turntable is 0.1 mm, the roll inclination sensitivity becomes about 0.5 degrees or more, and a tilt occurs on the objective lens 3 of one time or more at a maximum. In this case, a modulation is caused to the RF signal and a track error signal, and then record characteristics are remarkably degraded. When this synchronizes with the spindle rotation frequency at the time of reproduction and the modulation is generated, a problem occurs on reproduction characteristics.

Figure 7A:
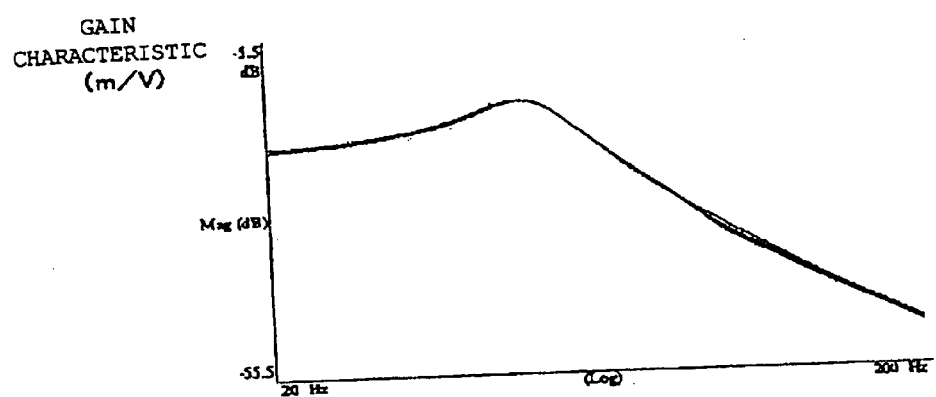
FIG. 7A is a diagram showing the gain characteristic indicating the frequency response characteristic in the tracking direction in a characteristic of the lens actuator in which the 32-times speed reproduction CAV and the 8-times record CLV are employed.
Figure 7B:
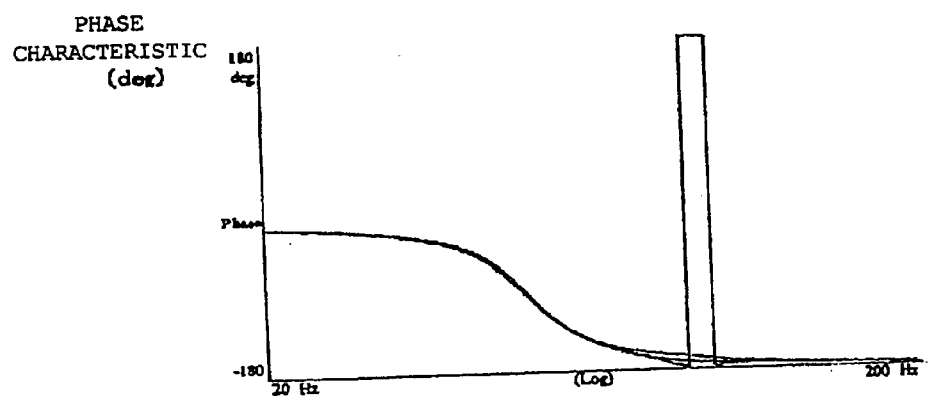
FIG. 7B is a diagram showing the phase characteristic indicating the frequency response characteristic in the tracking direction in a characteristic of the lens actuator in which the 32-times speed reproduction CAV and the 8-times record CLV are employed.

FIG. 7A is a diagram showing the gain characteristic indicating the frequency response characteristic in the tracking direction in a characteristic of the lens actuator 100 in which the 32-times speed reproduction CAV and the 8-times record CLV are employed, and FIG. 7B is a diagram showing the phase characteristic indicating the frequency response characteristic in the tracking direction in a characteristic of the lens actuator 100 in which the 32-times speed reproduction CAV and the 8-times record CLV are employed. In FIG. 7A and FIG. 7B, the frequency response characteristic is shown in the tracking direction at the focus neutral position and around 0.3 mm.

Roll resonance frequency is considered to a spindle rotation frequency, and although a tracking natural value is approximately the same about 50 Hz as the conventional lens actuator, the roll resonance frequency is influenced and then exists in about 90 Hz. However, the roll resonance on a tracking response itself is not conspicuously shown due to degree of an active displacement and the roll inclination sensitivity. As described above, only by a reason in which there is not conspicuously shown in the active characteristic of the tracking, it may still cause a problem.

Figure 8:
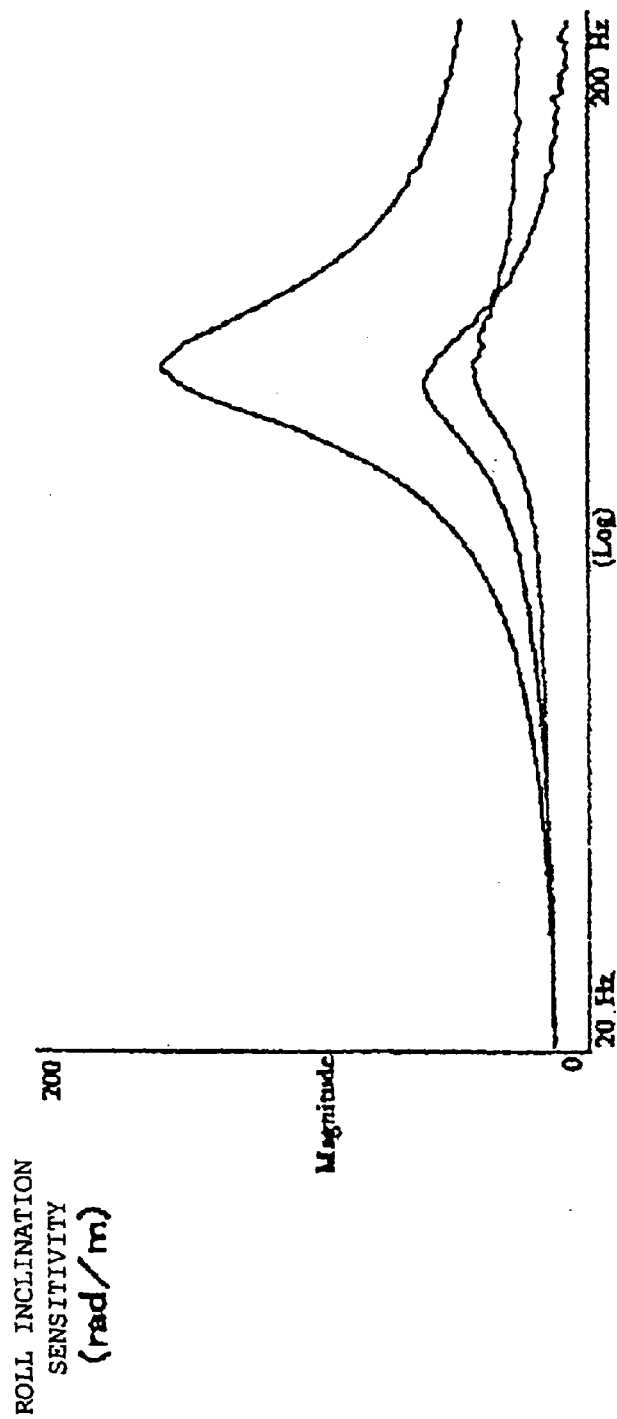
FIG. 8 is a graph showing the roll inclination sensitivity in the focus neutral position and ±0.3 mm.

In FIG. 8 similarly to FIG. 6, the roll resonance characteristic in the focus neutral position and ±0.3 mm is expressed with roll inclination sensitivity (rad/m) for displacement amplitude of tracking. The roll inclination sensitivity in a peak location about equal to the roll resonance frequency is approximately equivalent to that described above. In this case, it is considered that the peak location is distanced to either one of at 60–70 Hz at the OPC region of the 32-times speed reproduction CAV and 120 Hz at the 8-times speed record CLV. Therefore, it is possible to suppress the roll inclination sensitivity to be lower at frequency bands described above.

Also, in general, an optical disc drive device, in a case in which an optical disc which mechanical characteristic is extremely deteriorated is loaded, if a quality or reliability of the optical disk drive or the optical disk and signals may be affected when information is recorded or reproduced by the spindle rotational speed that turns into a recording or reproducing maximum speed to an optical disk without any consideration, it is considered that the rotation frequency is lowered so that recording or reproducing can be performed. In this embodiment, the roll resonance frequency is set so as to avoid the rotational resonance caused by the synchronous signal excitation, for the spindle rotation frequency based on the multiplied speed correspondence numeric value.

That is, a not-used rotation frequency is used for the roll resonance frequency in that the non-used rotation frequency is not used to avoid any spindle rotation frequency at a recording or reproducing speed based on the multiplied speed correspondence numeric value, which value is defined beforehand in accordance with the specification of the optical disk drive device. Therefore, it is possible to reduce influence of the roll resonance factor and then the optical disk drive device can perform at a high speed.

Accordingly, as described above, even when the roll resonance frequency cannot be set to be sufficiently higher for the spindle rotation frequency achieving the recording or reproducing maximum speed, or another support structure or the conventional configuration is employed, it is possible to reduce the influence of the roll resonance factor by a design for setting and adjusting the roll resonance frequency avoiding the spindle rotation frequency that achieves the recording or reproducing maximum speed in the specification of the optical disc device.

According to the first embodiment of the present invention, the roll resonance frequency is set to be a frequency other than spindle rotation frequency according to the specification of the optical disk drive corresponding to the multiplied speed correspondence numeric value. Also, the roll resonance frequency is set to be higher than a reproducing maximum speed according to the multiplied speed correspondence numeric value or the spindle rotation frequency in recording maximum speed. Alternatively, the roll resonance frequency is set to be lower then the reproducing maximum speed or the recording maximum speed and to be higher than the spindle rotation frequency, or is set to be between the spindle rotational frequencies of the reproducing maximum speed and the recording maximum speed. Therefore, it is possible to reduce influence by the roll resonance factor, and then it is possible to improve in the speed of the optical disk drive.

[Second Embodiment]

Figure 9:
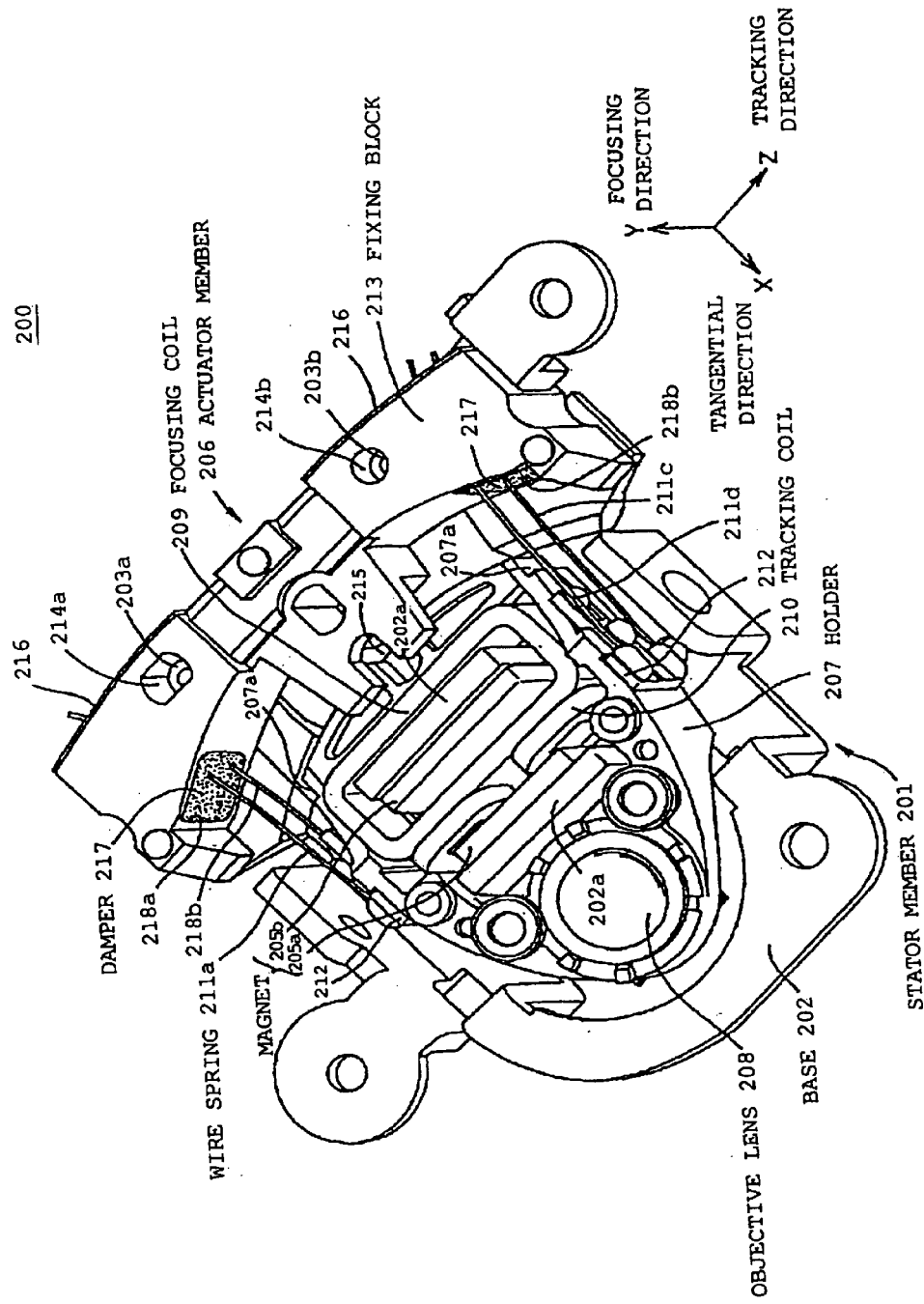
FIG. 9 is a perspective diagram showing the lens actuator assembly according to a second embodiment of the present invention.
Figure 10:
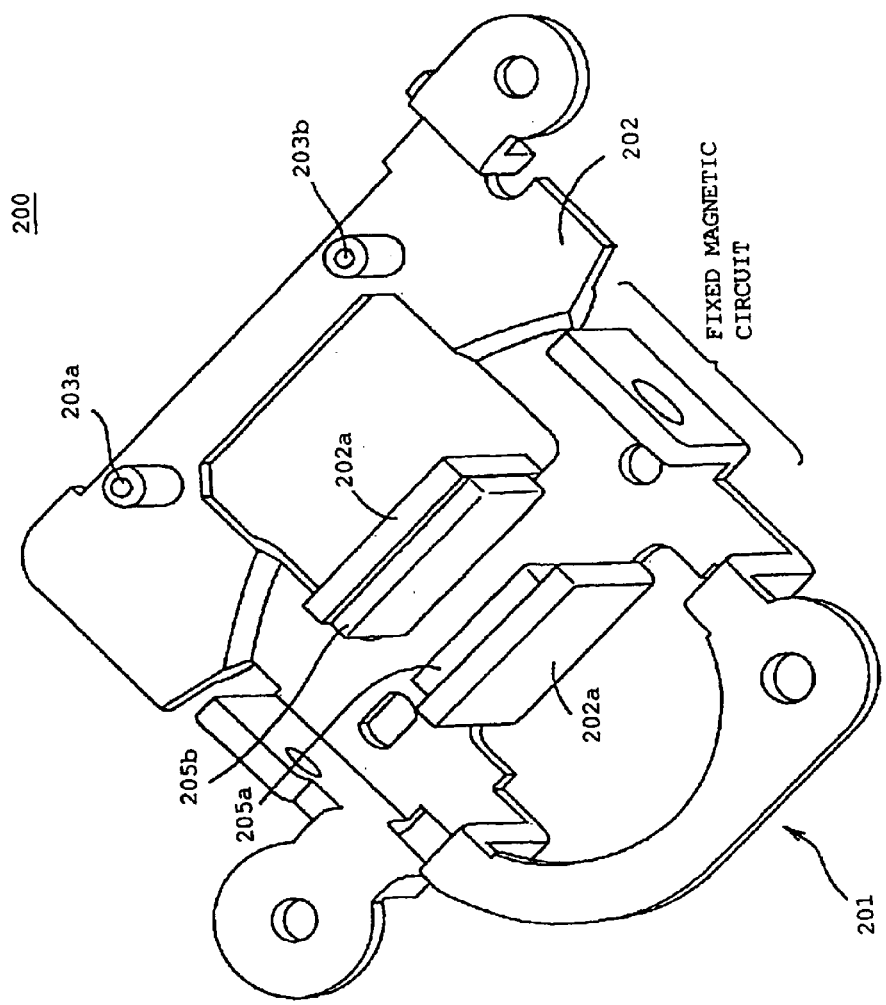
FIG. 10 is a perspective diagram showing a stator part containing a fixed magnetic circuit after decomposing the lens actuator assembly of FIG. 9.
Figure 11:
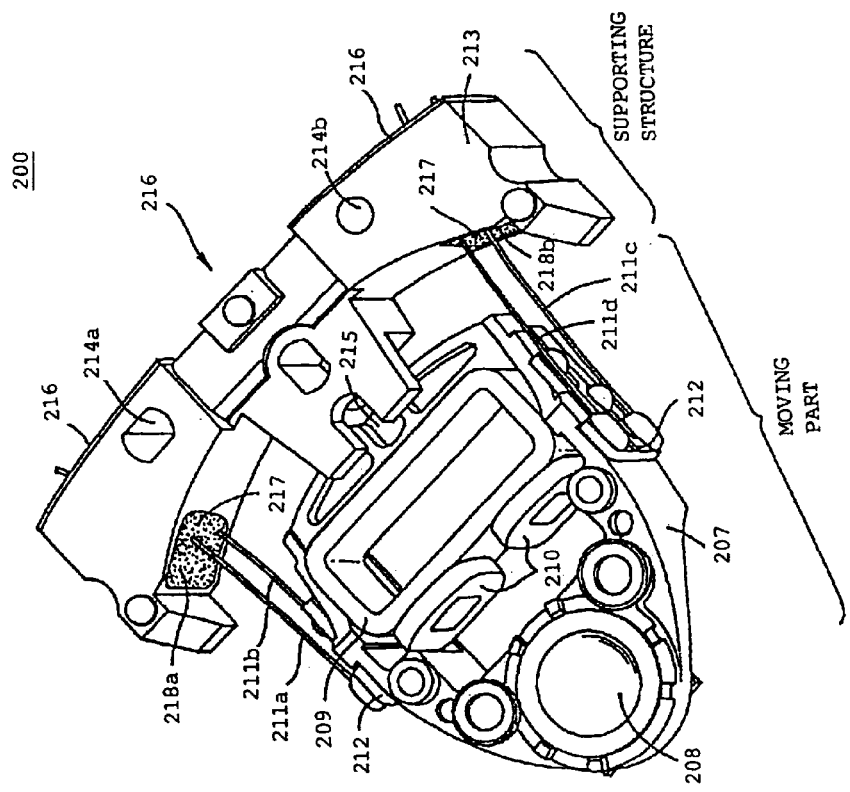
FIG. 11 is a perspective diagram showing an actuator part containing a movable part and a support structure after decomposing the lens actuator assembly of FIG. 9.

FIG. 9 is a perspective diagram showing the lens actuator assembly according to a second embodiment of the present invention. FIG. 10 is a perspective diagram showing a stator member containing a fixed magnetic circuit after decomposing the lens actuator assembly of FIG. 9. FIG. 11 is a perspective diagram showing an actuator part containing a movable part and a support structure after decomposing the lens actuator assembly of FIG. 9. In FIG. 9, a X-axis direction is a focusing direction and a Z-axis direction is a tracking direction (radial direction).

In FIG. 9 and FIG. 10, a lens actuator 200 includes a stator member 201, a base 202, bosses 203a and 203b, magnets 205a and 205b, and a standing wall 202a for fixing the magnets 205a and 205b on the base 202. The standing wall 202a also serves as a back yoke.

In addition, in FIG. 9 and FIG. 11, the lens actuator 200 includes an actuator part 206, a holder 207, an objective lens 208, a focusing coil 209, a tracking coil 210, wire springs 211a, 211b, 211c and 211d provided as elastic supporting members at both sides of the holder 207 (four wire springs in this embodiment), a printed circuit boards 212 for fixing ends of the wire springs 211a, 211b, 211c and 211d and for a coil electric supply, and a fixing block 213. In the fixing block 213, positioning holes 214a and 214b having a long hole and a circular hole where the bosses 203a and 203b are inserted, and a positioning groove 215 where a positioning boss (not shown) is inserted.

As shown in FIG. 11, in the movable part of the actuator part 206, the objective lens 208, the focusing coil 209, the tracking coil 210, the printed circuit board 212 for fixing the wire springs 211a, 211b, 211c and 211d and for coil electric supply are provided at the holder 207. As a support structure of the movable part, other ends of the wire springs 211a, 211b, 211c and 211d penetrate the fixing block 213 and also pass through hollows 218a and 218b that are filled with a damper 217 made from a gel material of a silicone type, and then are connected to a flexible printed circuit board 216 provided at the fixing block 213.

Alternatively, the other ends of the wire springs 211a, 211b, 211c and 211d may be connected and fixed to a metal pattern formed directly by a plating at the fixing block 213 that is a resin product, instead of connecting to the flexible printed circuit board 216.

In the second embodiment, the wire springs 211a, 211b, 211c and 211d are wire springs of metal products and are fixed by soldering for a supply power connection. Alternatively, any material and any cross sectional shape can be used. Moreover, as a fixing method, an adhesion or insertion molding method can be applied.

Figure 12:
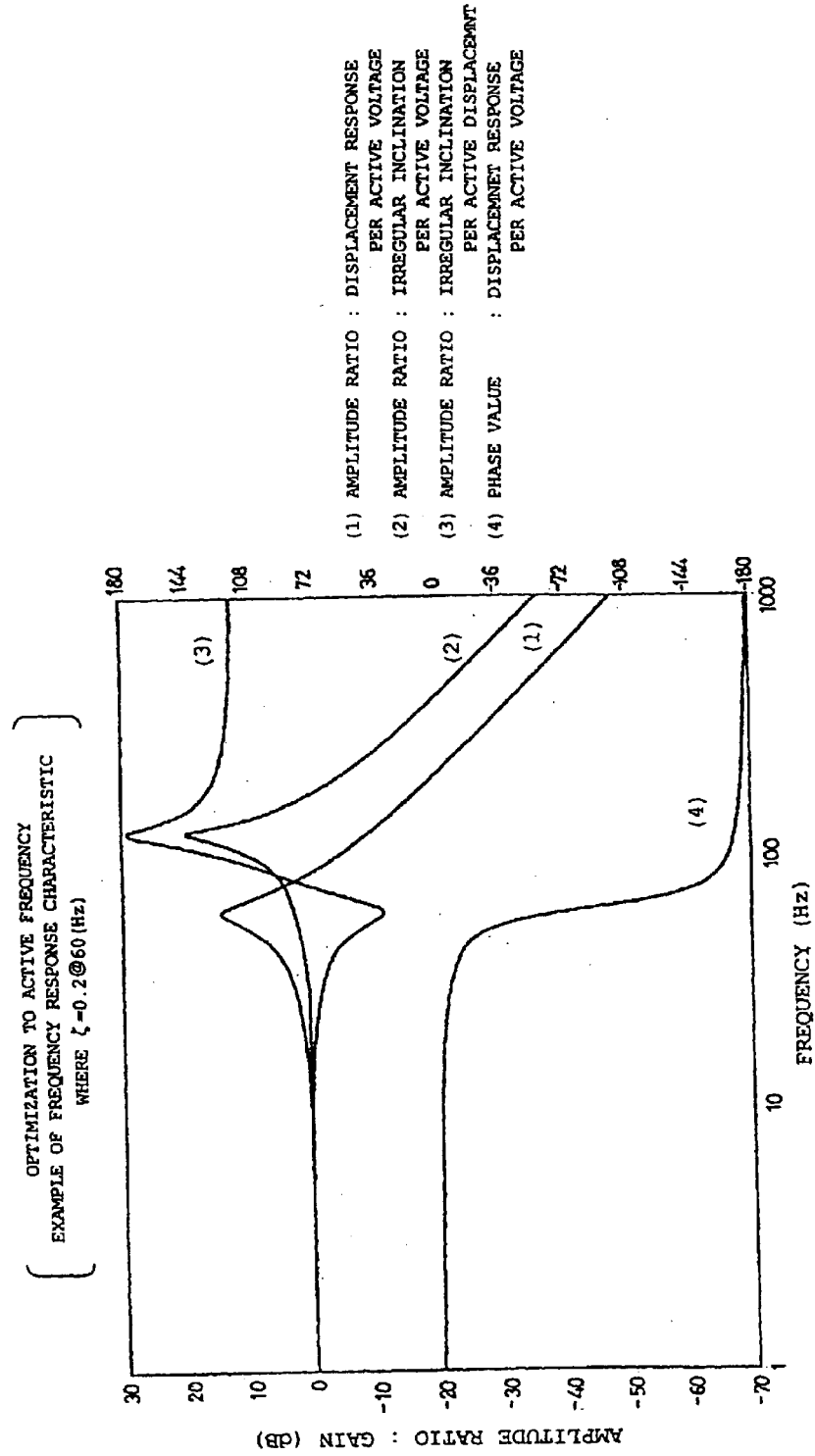
FIG. 12 is a diagram illustrating a frequency response characteristic of the objective lens actuator in that a conventional damper material is used.
Figure 13:
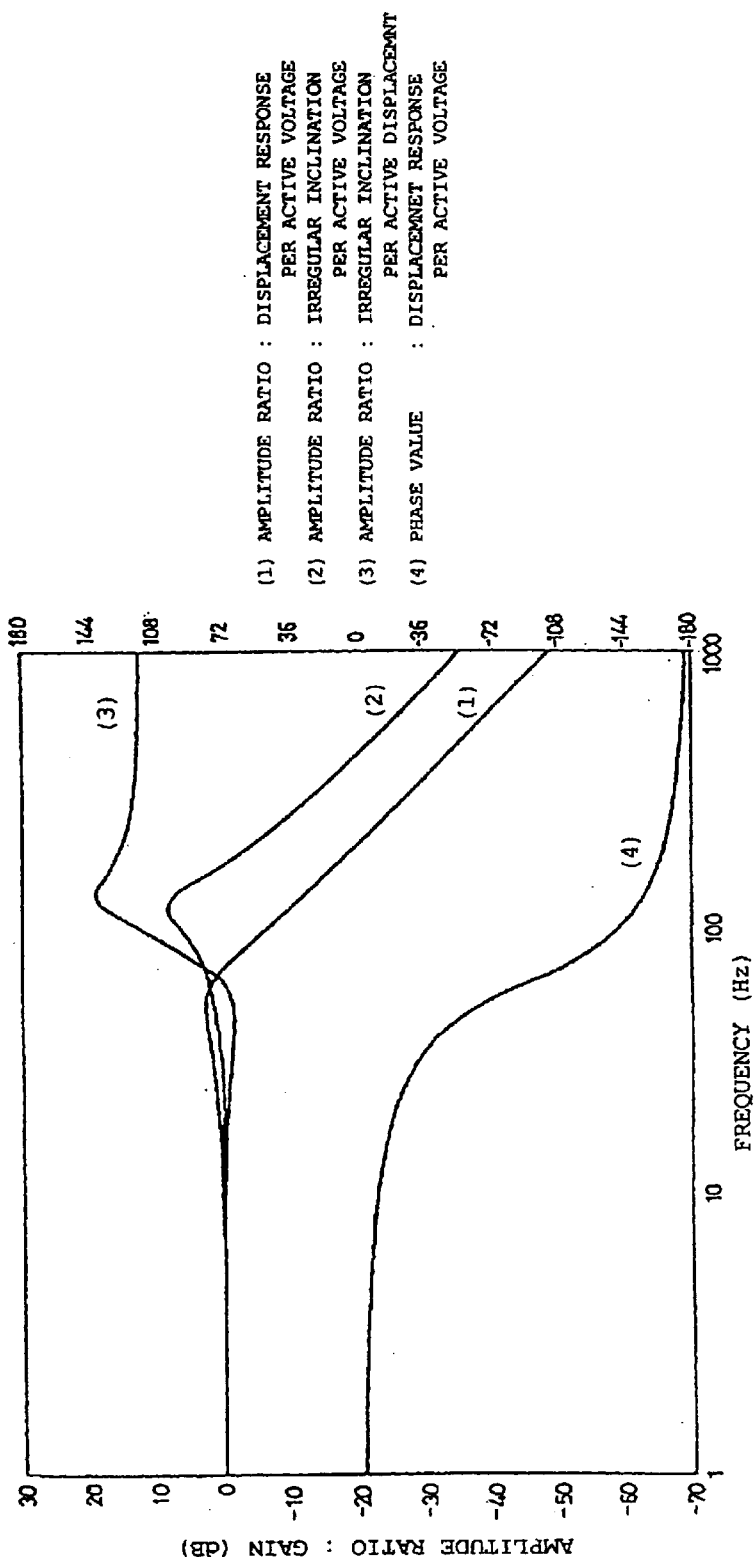
FIG. 13 is a diagram illustrating a frequency response characteristic of the objective lens actuator in that a conventional damper material is used.

FIG. 12 and FIG. 13 are diagrams illustrating a frequency response characteristic of the objective lens actuator 200 in that a conventional damper material is used. FIG. 14 is a diagram illustrating the frequency response characteristic of the objective lens actuator 200 according to the second embodiment of the present invention.

In each of FIGS. 12 through 14, a response amplitude ratio type 3 and a response phase type 1 are shown. In the response amplitude ratio, an active response (1), that is, a displacement response characteristic is illustrated per an active input voltage. In unwanted passive responses (2) and (3) irregular inclination amounts, which are caused around the tangential axis, that is, in a rolling direction when an active input is conducted, are illustrated. In one unwanted passive response (2), the irregular inclination is illustrated per an active voltage. And, in another unwanted passive response (3), the irregular inclination sensitivity is illustrated per an active displacement. The unwanted response (3) is expressed with the result of dividing (2) by (1). For the sake of convenience, the response amplitude ratio is shown by a gain (dB) in the amplitude ratio of the sensitivity of DC area to the sensitivity in each frequency.

The irregular inclination sensitivity per the active displacement in the response (3) is a sensitivity resulting from converting the irregular inclination per active voltage in the response (2) into a characteristic that easily appears in real operation. An operation in an active direction conducts a position control for the objective lens by a feed-back of a focusing error or a tracking error of the lens actuator 200. Thus, each of the inclination sensitivity in the response (3) and the inclination sensitivity in the response (2) are influenced by the displacement compulsive excitation in which a displacement amount given by the result of accumulating such as a surface deflection or an eccentric factor of a disk is to be the amplitude. Basically, in order to reduce the AC tilt in a vicinity of the roll frequency, it is still necessary to reduce the resonance magnification.

In FIG. 12, an optimized conventional damper material is used for the active frequency and a case in that an attenuation coefficient is $\zeta=0.2$ where the active frequency is 60 (Hz) is illustrated. In FIG. 12, the active response characteristic itself shows a good condition. However, sensitivity for a roll irregular inclination is too high and then becomes a problem. In the sensitive response (3), the roll irregular inclination amount is clearly shown in a real condition.

The roll irregular inclination is dependent on a moment occurred by generally coupling with thrust. This characteristic may be called a frequency response characteristic of a roll and sensitivity in this characteristic generally becomes at maximum in a vicinity of the roll resonance frequency. Although a peak occurs even in the active resonance frequency when the roll resonance actually occurs on this principle, for the sake of convenience, this can be negligence. The resonance magnification for each attenuation coefficient is not always equal. There are two reasons for this. First, when the attenuation coefficient in both frequencies is equal and the resonance frequency is high, the resonance magnification increases on a principle. Second, since the damper material that can maintain a constant attenuation coefficient in all frequency bands does not exist actually, the material which obtains the maximum attenuation coefficient in the vicinity of the active resonance frequency is conventionally used. As a result, the attenuation coefficient for a higher frequency is lowered. When the amount of the irregular inclination becomes larger, since a larger amount of the irregular inclination is detrimental on characteristics, the resonance magnification anyway should be lower.

On the other hand, in FIG. 13 similarly to FIG. 12, an optimized conventional damper material is used for the active frequency and a case in that an attenuation coefficient is $\zeta=0.4$ where the active frequency is 60 (Hz) is illustrated. In this example, a coupled roll irregular inclination sensitivity can be reduced but over attenuation occurs on an active response and then unfavorable hysteresis characteristic is generated in a low frequency.

Accordingly, in the second embodiment, instead of using the damper material that obtains maximum attenuation for the active resonance magnification, another damper materials is used. Another damper material obtains maximum attenuation or a maximum loss in a vicinity of the roll resonance frequency where the irregular inclination becomes maximum around the tangential axis detrimental to improvement in the speed, and/or, in a vicinity of a disk maximum rotation frequency that is to be a maximum compulsory exciting source in the roll resonance mode, that is, in a vicinity of a usable maximum rotation frequency of the optical disk recording/reproducing apparatus. Therefore, a phase delay in a lower frequency band by the over attenuation can be prevented. Then, as described FIG. 14, it can be realized that the active resonance magnification is properly maintained, and the fall of irregular-inclination sensitivity better than the conventional lens actuator can be obtained.

In addition, referring to FIG. 12 through FIG. 14, it is favorable to use a damper material having characteristics that can obtain maximum attenuation and maximum loss in a 100 through 200 Hz band, in order to adopt to a general objective lens actuator.

Alternatively, it is possible to use another damper material, which is made from materials including a polymeric composite or a polymeric material as a main material, or materials including a rubber composite or a rubber material as a main material, or materials including a silicone composite or a silicone material as a main material. Also, in accordance with a specification or characteristics of the optical disk recording/reproducing or the objective lens actuator 200, the damper material may selectively be used.

According to the second embodiment of the present invention, a damper is provided to the elastic supporting part supporting the movable part of the lens actuator 200 for resonance attenuation. In addition, in a vicinity of the resonance frequency around tangential and a vicinity of usable maximum rotation frequency of the optical disk recording/reproducing apparatus, the damper material having characteristics of obtaining maximum attenuation or maximum loss is used. Therefore, without having over attenuation in the active resonance frequency, the influence of a roll resonance factor detrimental to improvement in the speed can be suppressed effectively. Accordingly, it is possible to provide the objective lens actuator in that improvement in its speed can be realized.

The present invention is not limited to the specifically disclosed embodiments, and variations and modifications may be made without departing from the scope of the present invention.

The present application is based on the Japanese priority applications No.2000-251171 filed on Aug. 22, 2000 and NO. 2000-312225 filed on Oct. 12, 2000 entire contents of which are hereby incorporated by reference.

What is claimed is:

1. A lens actuator for use with an optical disk apparatus for recording and reproducing information by irradiating light condensed by an objective lens to an optical disk while rotating the optical disk by a spindle motor, said lens actuator actuating the objective lens to a tracking direction and to a focus direction by a magnetic operation, said lens actuator comprising:

a base;

a holder relatively moving to the tracking direction and the focus direction with respect to the base and holding the objective lens;

an elastic supporting member supporting the holder; and a fixed block provided on the base and fixing the elastic supporting member, wherein a roll resonance frequency is set to be a setting value different from a rotation frequency of the spindle motor in that the rotation frequency corresponds to a multiple value of a standard data transmission speed in the optical disk.

2. The lens actuator as claimed in claim 1, wherein the setting value is a frequency higher than the rotation frequency of the spindle motor in a case in which the spindle motor is rotated at eight times the standard data transmission speed.

3. The lens actuator as claimed in claim 2, wherein the setting value is a frequency lower than the rotation frequency of the spindle motor in a case in which the spindle motor is rotated at thirty two times the standard data transmission speed.

4. The lens actuator as claimed in claim 3, wherein the setting value is approximately 90 Hz.

5. A lens actuator for use with an optical disk apparatus for recording and reproducing information by irradiating light condensed by an objective lens to an optical disk while rotating the optical disk by a spindle motor, said lens actuator actuating the objective lens to a tracking direction and to a focus direction by a magnetic operation, said lens actuator comprising:

a base;

a holder relatively moving to the tracking direction and the focus direction with respect to the base and holding the objective lens;

an elastic supporting member supporting the holder;

a fixed block provided on the base and fixing the elastic supporting member; and a damper member provided to the elastic supporting member for a resonance attenuation, wherein the damper member is filled in the fixing block and has a feature of obtaining a maximum attenuation or a maximum loss in a vicinity of a roll resonance frequency.

6. A lens actuator for use with an optical disk apparatus for recording and reproducing information by irradiating light condensed by an objective lens to an optical disk while rotating the optical disk by a spindle motor, said lens actuator actuating the objective lens to a tracking direction and to a focus direction by a magnetic operation, said lens actuator comprising:

a base;

a holder relatively moving to the tracking direction and the focus direction with respect to the base and holding the objective lens;

an elastic supporting member supporting the holder;

a fixed block provided on the base and fixing the elastic supporting member; and a damper member provided to the elastic supporting member for a resonance attenuation, wherein the damper member is filled in the fixing block and has a feature of obtaining a maximum attenuation or a maximum loss in a vicinity of a use roll resonance frequency.

7. A lens actuator for use with an optical disk apparatus for recording and reproducing information by irradiating light condensed by an objective, lens to an optical disk while rotating the optical disk by a spindle motor, said lens actuator actuating the objective lens to a tracking direction and to a focus direction by a magnetic operation, said lens actuator comprising:

a base;

a holder relatively moving to the tracking direction and the focus direction with respect to the base and holding the objective lens;

an elastic supporting member supporting the holder;

a fixed block provided on the base and fixing the elastic supporting member; and a damper member provided to the elastic supporting member for a resonance attenuation, wherein the damper member is filled in the fixing block and has a feature of obtaining a maximum attenuation or a maximum loss in a vicinity of a use maximum rotation frequency to a vicinity of a roll resonance frequency.

* * * * *